J. L. MOORE.
CUT-OFF VALVE.
APPLICATION FILED FEB. 24, 1905.

940,815.

Patented Nov. 23, 1909.
3 SHEETS—SHEET 2.

WITNESSES:

INVENTOR

BY

ATTORNEY

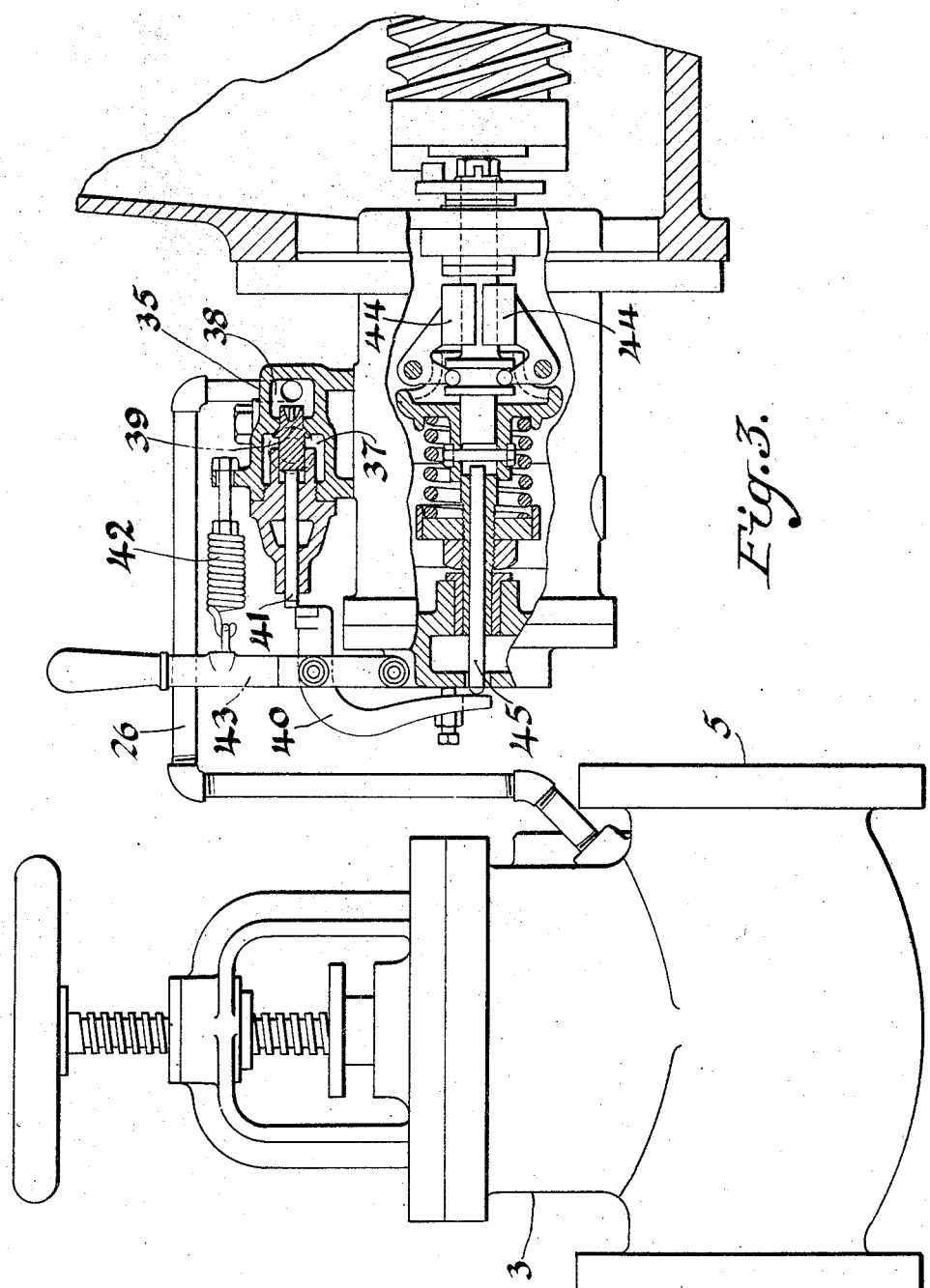

UNITED STATES PATENT OFFICE.

JAMES LEONARD MOORE, OF EDGEWOOD PARK, PENNSYLVANIA, ASSIGNOR TO THE WESTINGHOUSE MACHINE COMPANY, A CORPORATION OF PENNSYLVANIA.

CUT-OFF VALVE.

940,815.

Specification of Letters Patent.

Patented Nov. 23, 1909.

Application filed February 24, 1905. Serial No. 247,119.

*To all whom it may concern:*

Be it known that I, JAMES LEONARD MOORE, a citizen of the United States, and a resident of Edgewood Park, in the county of Allegheny and State of Pennsylvania, have invented a new and useful Improvement in Cut-Off Valves, of which the following is a specification.

This invention relates to valves, and more particularly to automatic cut-off valves.

The object of this invention is the production of means, in connection with a throttling valve, for automatically cutting off the supply of motive fluid to the said valve when the engine or machine to which it is attached exceeds some predetermined speed.

A further object of this invention is the production of means for simplifying the construction of a cut-off valve, and for insuring its quick and reliable action.

A difficulty with automatic cut-off valves as applied to fluid pressure engines, has been in the application of a force sufficiently great to operate the valve quickly and reliably, and, at the same time, in maintaining a delicate adjustment in the automatic controlling device by means of which the force is applied. It has, therefore, been my object to construct a valve that shall act instantaneously and with sufficient force to absolutely perform its functions, and, at the same time, one that shall be controlled by a very slight motion or pressure in the governing or controlling device.

Figure 1:
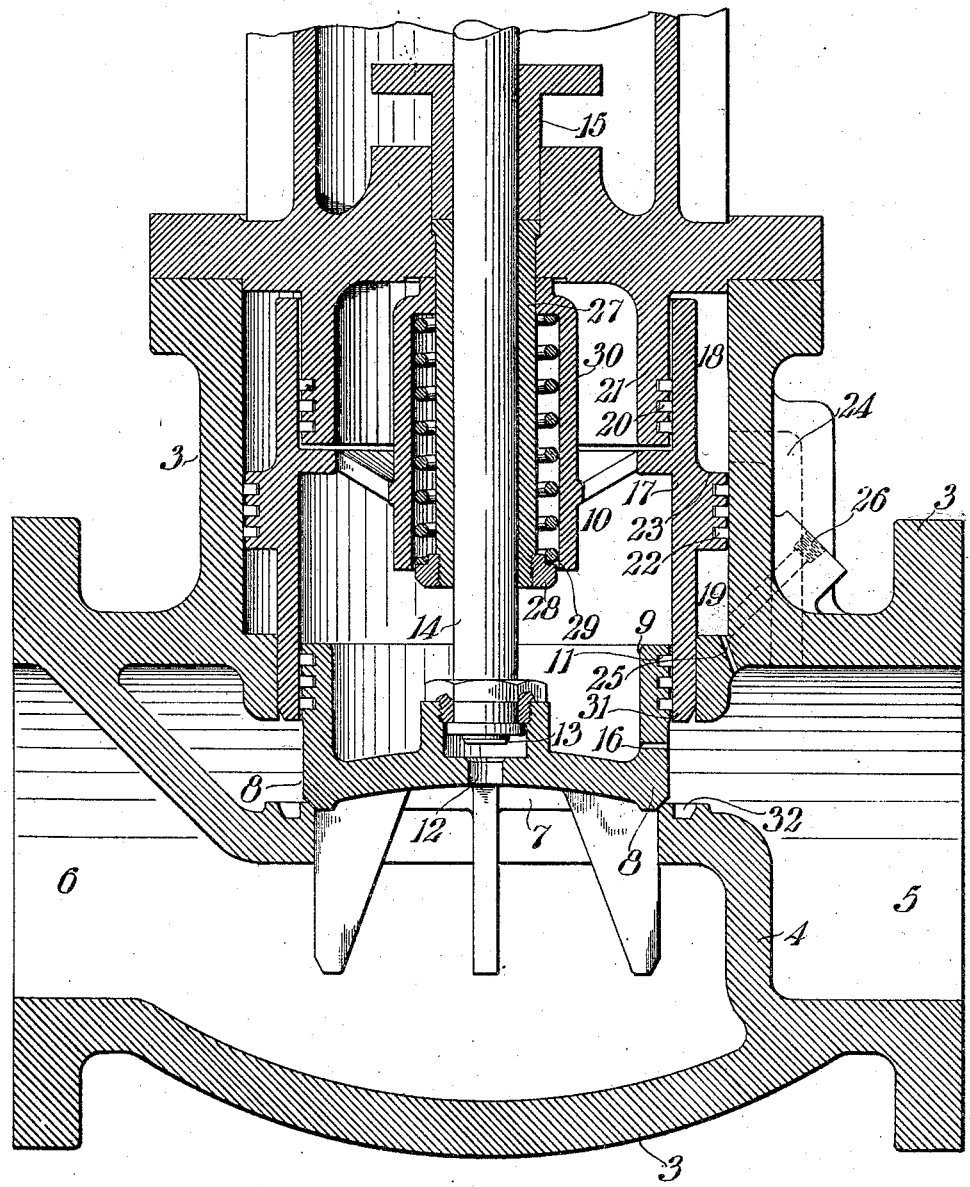
Figure 2:
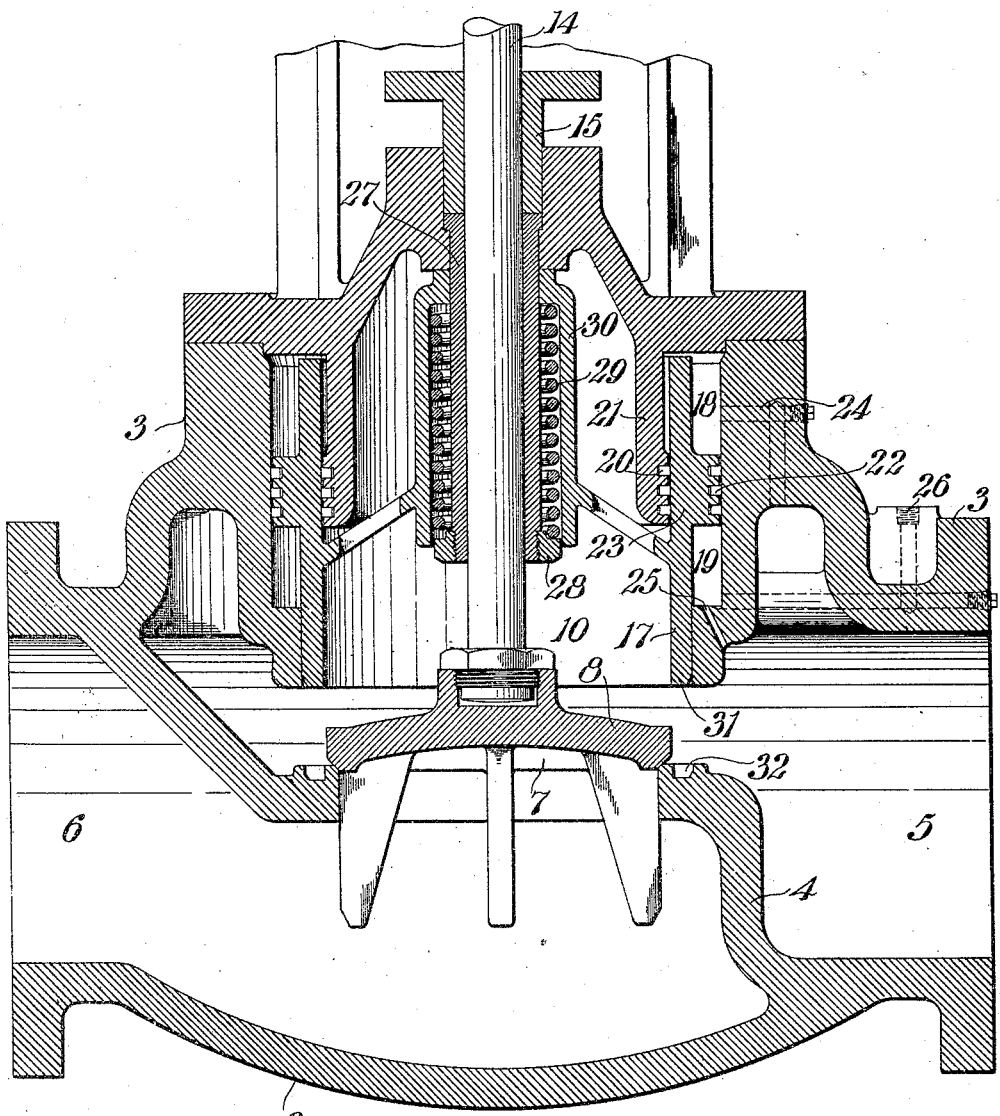

In the drawings accompanying this application, and forming a part thereof, Figure 1 is a section of the automatic cut-off valve as applied to a balanced globe valve; Fig. 2 is the automatic cut-off valve shown in connection with an ordinary globe valve and Fig. 3 illustrates a speed responsive device, shown partially in section, in connection with an elevation of the exterior of a valve embodying my invention.

A brief description of the globe valve, shown in Fig. 1 and its operation, will be necessary in describing the automatic cut-off valve.

The valve casing 3 is provided with the usual diaphragm 4 between the inlet passage or port 5 and the outlet passage or port 6; this diaphragm having a main valve port 7, the walls or rim of which, at one side, constitute the seat for the valve 8. The valve 8 is provided with extensions 9, having the form of a hollow piston, located and movable in the cylinder 10, which form a portion of the passage 5. The cylindrical portion 9 of the valve 8 is provided with packing rings 11 which engage with the cylindrical surface of the chamber 10. The body of the valve 8 is provided with a steam port 12 communicating with low pressure passage 6 of the globe valve, which port is normally closed by means of the valve 13 having a stem 14 that also serves as the stem for the valve 8, and which projects through a suitable stuffing box 15 with which the casing is provided.

The stem 14 is provided with suitable means, (not shown) such as a hand-wheel, for operating the valves to which it is attached.

The cylindrical portion 9 of the valve 8 is provided with a small port or passage 16, which provides a communication between the inlet port or passage 5 and the cylinder or space 10 beyond the valve 8 and its piston or cylindrical portion 9.

The operation of the valve is as follows: The steam or other fluid under pressure will leak through the port or passage 16 until the space above the piston and valve is filled. Then the entire pressure of the fluid on the inlet side is exerted in such a direction as will tend to hold the valve to its seat. It is obvious that if this pressure were not relieved by some means, a very large expenditure of force would be necessary in order to open the main valve 8, provided it were of considerable size. In order to relieve this pressure, the stem 14, in turning, first raises the valve from its seat, opening the port or passage 12. The pressure above the valve 8 and that below is thus made substantially equal, as the port 12 is sufficiently large to admit of an unrestricted flow of the steam or motive fluid through the cylindrical chamber 10. The valve 8 is then substantially balanced, and may be readily unseated by the application of a comparatively small amount of power at the hand-wheel in the further upward movement of the stem 14. After the valve is unseated, the port 12 remains open, equalizing the pressure on both sides of the valve 8. In closing the valve 8 the port 12 remains open until after the valve is seated, then a further motion of the stem 14 closes the port 12.

Cut-off valve 17 within the casing 3 operates coaxially with the main valve 8, and the construction of it is such, that the annular chambers 18 and 19 are formed between it, the said cut-off valve, and the exterior casing 3 of the globe valve.

Packing rings 20, mounted on a cylindrical lug 21 of the casing 3, seal the annular chamber 18. Packing rings 22, mounted on the collar 23, which the cut-off valve 17 carries, engage the cylindrical casing 3 of the globe valve and seal the annular chamber 19.

A port 24, connected with the passage 5, supplies steam or other motive fluid at initial pressure to the cylindrical chamber 18. A smaller and restricted passage 25 supplies initial steam to the chamber 19 by connecting it with the passage 5. The annular chamber 19 is also supplied with an exhaust passage 26, which is fitted with an automatically actuated valve 35. The automatic action of the valve in this passage 26 depends upon the speed of the engine. The valve normally closes the passage 26, and is so adjusted that for some predetermined speed of the engine, it will open the passage. This valve may be one of the many now common, and can be operated by a tripping device, or other familiar means, actuated by a governor or governing device operated by the engine.

A sleeve 27 around the stem 14 of the main valve is mounted firmly to the casing 3 and carries an adjustable nut 28 upon which is seated a spiral spring 29, surrounding the sleeve, which operates against a cylindrical portion 30 of the cut-off valve in holding it in the position shown. Under these conditions, and with the automatic valve 35 in the passage 26 closed, the chamber 18, the chamber 19, and the cylindrical space 10 are under initial pressure, and the spring 27 having no external pressure to overcome, with the exception of the weight of the valve 17, operates against the portion 30 and holds the valve 17 open.

The size of the passage 26 is such that when the valve 35 is open, the steam or other motive fluid is exhausted from the annular chamber 19 through this passage 26 faster than it can be admitted through the passage 25. For this reason the steam flowing through the annular chamber 19 exerts practically no pressure in that chamber, and since the steam pressure in the annular chamber 18 is unchanged and the flow of steam to that chamber is unimpeded, the valve 17, because of the unbalanced steam pressure exerted on the collar 23, will be forced to its lowest position. In this position, the edge or rim 31 of the cut-off valve will seat in the groove 32 with which the diaphragm 4 is supplied. This action of the valve 17 closes the connection between the high pressure passage 5 and the low pressure passage 6.

The automatically actuated valve 35, controls the delivery of fluid through the passage 26 and comprises a casing which is divided into separate chambers 37 and 38 and a valve disk 39. The chamber 38 communicates with the passage 26 and the chamber 37 communicates through a suitable port with the atmosphere or with a condenser. The valve disk 39 operates to open or close communication between the respective chambers and thereby controls the delivery of fluid from the chamber 19 through the passage 26. The disk 39 is held closed by means of a trip lever 40, which is held against the valve stem 41 by means of a spring 42 operating through a suitable replacing lever 43. The trip is arranged to release the valve stem 41 and open the valve 35 when the speed of the engine receiving fluid from the main supply valve is increased beyond some predetermined amount. This is accomplished by means of the automatic cut-off governor which is operated by the rotatable shaft of the engine.

The governor comprises centrifugal weights 44, which are arranged to move, under the influence of centrifugal force, to release the stem 41 by tripping the lever 40 through the agency of a pin 45 when the engine, to which they are connected, exceeds a certain predetermined speed. The valve disk 39 is held closed against the steam pressure in the chamber 38 and consequently when the stem 41 is released by the trip lever 40 the disk 39 is moved by the steam pressure in the chamber 38 to establish communication between the chambers 37 and 38, and thereby exhaust the fluid from the chamber 19 and permit the cut-off valve to close, as has been described.

In Fig. 2 the cut-off valve is shown applied to the ordinary globe valve; the casing 3 is supplied with the usual diaphragm 4; the valve 8, in closing the port 7, seats upon this diaphragm; the passage 5 connects with the cylindrical portion 10 in which the automatic cut-off valve 17 operates.

The cut-off valve is of such formation that with the sides of the cylinder 10 it forms the annular chambers 18 and 19. Steam at initial pressure is admitted to the chamber 18 through the port or passage 24, and is admitted to the annular chamber 19 through the restricted passage 25. The chamber 19 is also supplied with an exhaust passage 26.

As in the previous case, the exhaust passage 26 is fitted with an automatically operated valve, the operation of which in opening the passage 26 permits the cut-off valve 17 to be driven by the steam pressure in the annular chamber 18 to its lowest position, the rim 31 seating in the groove 32 with which the diaphragm 4 is supplied. This, as in the case of the balanced globe valve, cuts off the fluid supply to the valve 8.

After the automatically operated valve in the passage 26 has been opened and the cut-off valve has operated, any suitable means for again closing the passage and re-adjusting the controlling device may be used.

When the passage 26 is closed, the annular chamber 19 is soon filled with initial steam from the passage 25, and the pressure in this annular chamber balances that of the annular chamber 18, and since the spring 29 has now no external pressure to overcome, it again raises the cut-off valve 17 to its normal position.

What I claim is:—

1. The combination with a valve casing, a throttle valve operating therein to control the flow of fluid through said casing, a cut-off valve surrounding said throttle valve and operating coaxially therewith to cut off the flow of fluid through said casing, a chamber exposed to fluid pressure whereby the said cut-off valve is balanced, and means for exhausting said chamber whereby the said cut-off valve is caused to close.

2. The combination of a valve casing, a throttle valve operating therein, a fluid actuated cut-off valve surrounding said throttle valve and operating coaxially therewith, a chamber, exposed to fluid pressure, whereby said cut-off valve is balanced, a spring for holding said cut-off valve normally open, and means for exhausting said chamber whereby said cut-off valve is closed against the pressure of said spring.

3. In combination in a valve casing, a manually operated throttle valve, a fluid-actuated cut-off valve within said casing and controlling the delivery of motive fluid past said throttle valve, a pressure chamber located within said casing, for balancing the fluid pressure on said cut-off valve and thereby maintaining it open, and means for exhausting the fluid from said chamber and thereby closing said cut-off valve.

4. In combination in a valve casing, a manually operated throttle valve, a fluid-actuated cut-off valve located within the casing and controlling the delivery of motive fluid past said throttle valve, pressure chambers exposed to fluid pressure within said casing for balancing said cut-off valve, means for maintaining said valve open and means for exhausting one of said chambers and thereby closing said valve in opposition to said opening means.

5. In combination in a valve casing, a manually operated throttle valve, a fluid-actuated cut-off valve located within said casing and controlling the delivery of motive fluid past said throttle valve, a pressure chamber exposed to the pressure within said casing, for maintaining said valve open, and means for exhausting said chamber and thereby closing said valve.

6. In combination in a valve casing provided with an inlet port, an outlet port and a ported diaphragm between the ports, a valve, seating on said diaphragm, to close communication between said ports, a cut-off valve operating within said casing and seated on said diaphragm to close communication between said ports and fluid-actuated means within said casing for controlling the operation of said cut-off valve.

7. In combination in a valve casing provided with an inlet port and an outlet port, a ported diaphragm located between said ports, a valve, seating on said diaphragm, to close communication between said ports, a cut-off valve surrounding said valve and seating on said diaphragm to control the delivery of fluid past said valve and means, receiving motive fluid from within said casing, for actuating said cut-off valve.

8. In combination in a valve casing, a throttle valve, a cut-off valve surrounding said throttle valve and operating co-axially with and independently of the throttle valve and fluid-actuated means within said casing for controlling the operation of said cut-off valve.

9. In combination in a valve casing, a throttle valve operating therein, a cut-off valve surrounding said throttle valve and operating co-axially with and independently of the throttle valve, and fluid-actuated means receiving fluid from within said casing for controlling the operation of said cut-off valve.

10. In combination in a valve casing, a throttle valve operating therein, a cut-off valve surrounding said throttle valve and operating independently thereof, means for yieldingly holding said cut-off valve open and fluid-actuated means, located within said casing and receiving motive fluid therefrom, for closing said cut-off valve in opposition to said yielding means.

11. A fluid-pressure engine, a fluid-supply valve therefor comprising a valve casing provided with inlet and outlet ports, a valve operating within said casing to control the communication between said ports, in combination with a cut-off valve located within said casing and operating to close communication with said ports, fluid-actuated means within said casing controlling the operation of said cut-off valve and means, dependent on the speed of said engine, for controlling the operation of said fluid-actuated means.

12. A valve casing provided with an inlet and an outlet port, a valve operating therein to control the passage of motive fluid through said ports, in combination with a cut-off valve located within said casing and controlling the delivery of motive fluid through said ports, fluid-actuating means for said cut-off valve receiving motive fluid from said casing and an automatically actuated valve for controlling the operation of said actuating means.

13. In combination in a valve casing, a throttle valve having a stem projecting through the casing, a rigid sleeve around the stem, a cut-off valve concentric with the stem and the throttle valve, a spring bearing against a part on the sleeve and normally supporting the cut-off valve, means within the casing for exerting opposed pressures on opposite sides of the cut-off valve and means for exhausting pressure from one side of the cut-off valve.

14. In combination, a valve casing, a throttle valve in said valve casing, a cut-off valve concentric with the throttle valve, a spring normally holding the cut-off valve unseated, means within the valve casing for exerting opposing pressures on opposite sides of the cut-off valve and means within the casing for exhausting pressure from the side of the cut-off valve opposed to the spring.

In testimony whereof, I have hereunto subscribed my name this 25th day of January, 1905.

JAMES LEONARD MOORE.

Witnesses:
W. S. THOMPSON,
DAVID WILLIAMS.